S. T. ALLEN.
VEHICLE TIRE.
APPLICATION FILED APR. 10, 1911.
1,023,779.
Patented Apr. 16, 1912.
3 SHEETS—SHEET 1.
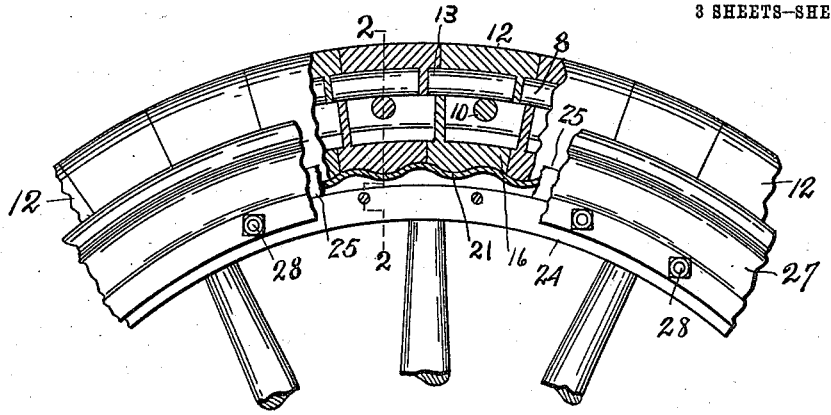
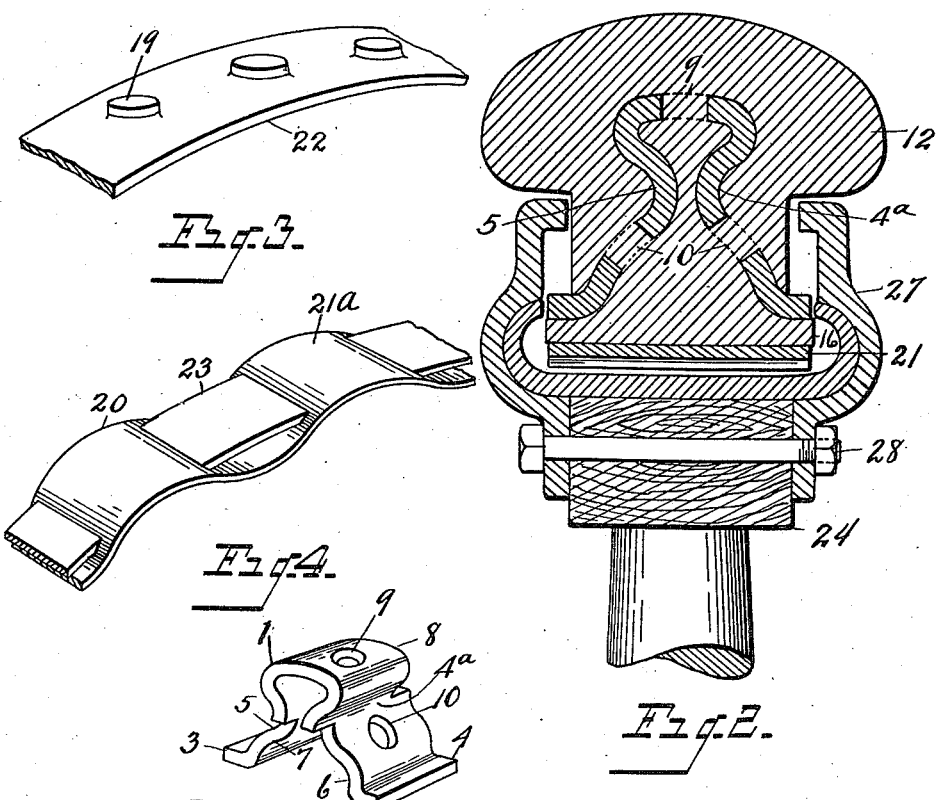

S. T. ALLEN.
VEHICLE TIRE.
APPLICATION FILED APR. 10, 1911.
1,023,779.
Patented Apr. 16, 1912.
3 SHEETS—SHEET 2.
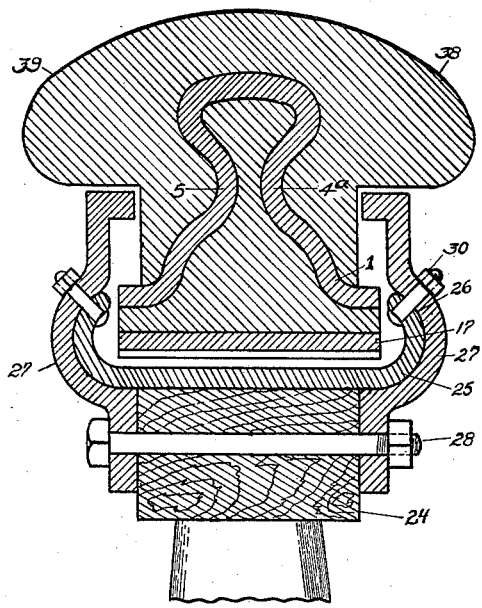
FIG. 6
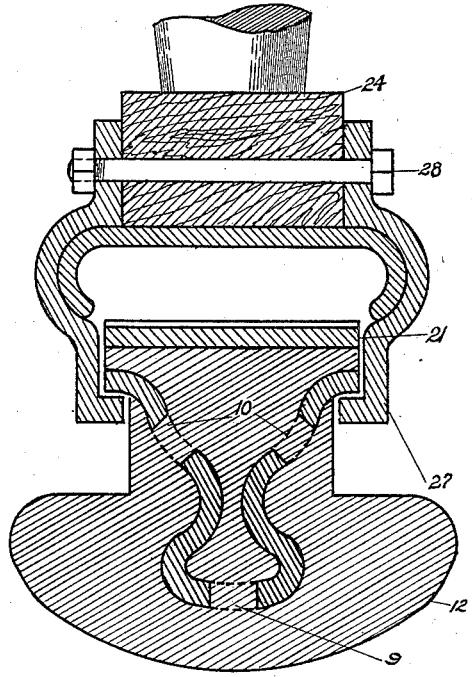
FIG. 14
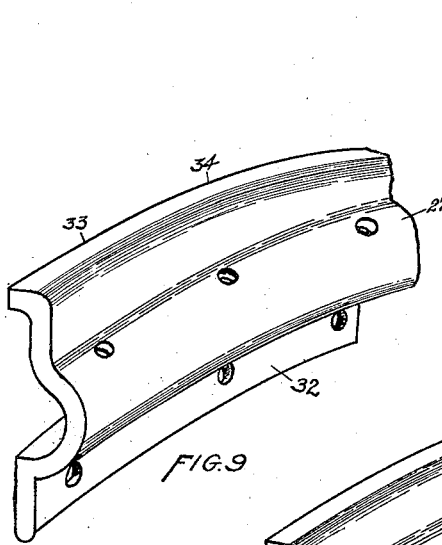
FIG. 9
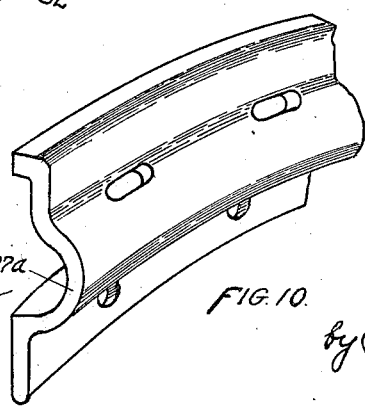
FIG. 10
FIG. 8
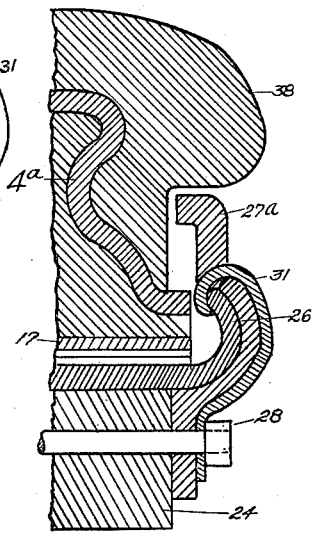
FIG. 7
WITNESSES.
O. B. Baenziger.
Agnes Hipkins.
INVENTOR
Sherman T. Allen
by Parker & Burton
Attorneys.

S. T. ALLEN.
VEHICLE TIRE.
APPLICATION FILED APR. 10, 1911.

1,023,779.

Patented Apr. 16, 1912.

3 SHEETS—SHEET 3.

Witnesses
Q. B. Baenziger.
Agnes Hipkins

Inventor
Sherman T. Allen
By Parker & Burton
Attorneys

UNITED STATES PATENT OFFICE.

SHERMAN T. ALLEN, OF DETROIT, MICHIGAN, ASSIGNOR TO TRIPLEX TIRE COMPANY, OF DETROIT, MICHIGAN, A CORPORATION.

VEHICLE-TIRE.

1,023,779. Specification of Letters Patent. Patented Apr. 16, 1912.

Application filed April 10, 1911. Serial No. 619,992.

*To all whom it may concern:*

Be it known that I, SHERMAN T. ALLEN, a citizen of the United States, residing at Detroit, county of Wayne, State of Michigan, have invented a certain new and useful Improvement in Vehicle-Tires, and declare the following to be a full, clear, and exact description of the same, such as will enable others skilled in the art to which it pertains to make and use the same, reference being had to the accompanying drawings, which form a part of this specification.

This invention relates to vehicle tires.

It has for its object an improved sectional tire for vehicle wheels.

Figure 11:
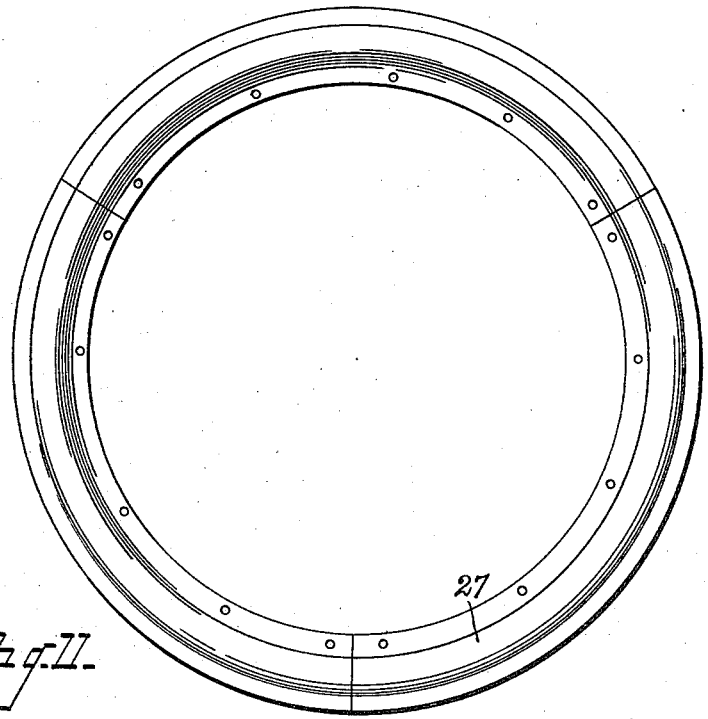
Figure 12:
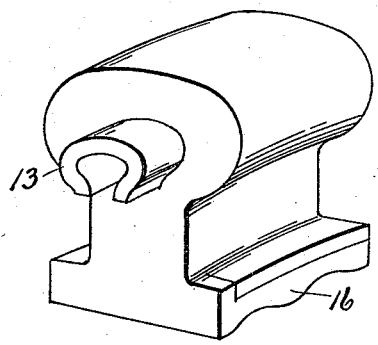
Figure 13:
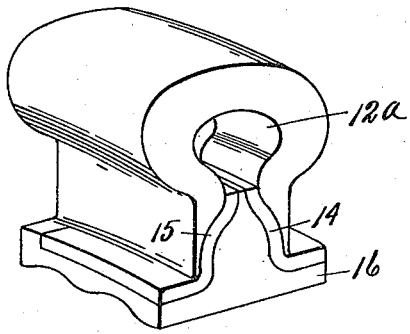

In the drawings:—Figure 1, is a side elevation of a portion of the wheel, showing a portion of the tire in longitudinal section. Fig. 2, is a cross section at the line 2—2 of Fig. 1, the rubber cushion member being shown in extreme retracted position with respect to the laterally engaging flanges on each side thereof. Fig. 3, shows a modified form of spring base. Fig. 4, shows a further modified form of spring base. Fig. 5, is a perspective showing the metal core of a section. Fig. 6, is a vertical cross section showing means of attaching the side flanges to a wheel; the position of the parts herein shown is with the hoop and the rubber tire section in extreme indrawn position toward the wheel felly. Fig. 7, is a vertical cross section showing another means of attaching a side flange. Fig. 8, shows a hook employed in connection with the side flange shown in Fig. 7. Fig. 9, shows the side flange employed in Fig. 6. Fig. 10, shows the side flange employed in Fig. 7, through the slotted portions of the body of which the holding hooks, which are used in the device of Fig. 7 in connection with a clencher rim, may engage. Fig. 11, is a side elevation of the flanges of a wheel in their assembled relation. Fig. 12, is a perspective showing the dowel end of a section of the tire. Fig. 13, is a perspective showing the concrete end of a section of a tire. Fig. 14 is a vertical section through the tire, felly, and side flanges of a wheel as it rests upon the ground, but with no load.

The tire as a whole is made up of sections, each one of which is composed of a rubber envelop on a metallic reinforcing part; the sections engage together to form a complete circle around the wheel, and these rest on a resilient hoop that is larger than the wooden felly of the wheel, and in motion yields to bring its upper surface into engagement with the lower run or felly as the wheel felly rests upon the hoop, and to spring or carry its upper run free from the upper run of the felly. Furthermore the sections of the tire are so constructed and so arranged with reference to side flanges which are secured to the felly, that when the rubber sections come into bearing engagement with the flanges they relieve the hoop that has been mentioned of some part of its bearing along the under run of the wheel and tire. Each section of the tire is made principally of rubber, and the construction will be understood from an inspection of Figs. 2, 6, 7, 12 and 13. A spanner or reinforcing piece of metal 1 bent into a form that may be compared somewhat to an inverted V is constructed with the part of the metal and the bend between the two flanges 3 and 4 spreading to form a structure that may here be compared to a split tube, and for purposes of clearness, the part of this metal between the contractions 4ª and 5 and the turn of the metal will be called the looped part of the reinforcing piece, and the branches or arms between the contractions and the outer edges will be called the spreading parts of the reinforcing piece. The split tubular part of the reinforcing piece is extended at one end of the structure beyond the terminals of the branches or arms 6 and 7, and at the other end is drawn in or shorter than the spreading part. Each looped part is provided with a hole or number of holes 9, and each of the spreading parts is provided with a hole 10, and the interior of the looped part and the space between the spreading parts, are filled with a cushioning member, preferably rubber, which, is formed about this reinforcing piece, so that only the inner ends project therefrom, thus constituting an integral piece with an outer envelop of rubber 12 which surrounds the reinforcing piece, except where the part 13 projects from one end as a dowel, whose cavity is, however, filled with rubber; at the other end of the section the ends 14 and 15 of the branches or arms 6 and 7 are visible, the rubber extending from the body of the section backward around a cavity 12ª in which the dowel 13 engages. Underneath the branches or arms 6 and 7 the rubber continues from the interior of the reinforce and broadens to form a flat base plate 16, which in the assembled structure rests on the hoop 22 or its modified form 23, and the surface of this base, that which is to come in contact with the hoop, is finished to conform with the surface of the particular kind used.

The form shown in Fig. 4 is corrugated with the hoop piece 23 extending through transversely slitted portions of the waving portion 20 and $21^a$ of the corrugated hoop. If the form 22 shown in Fig. 3 is used, the under face of the base is provided with indentations that engage over the projections 19. If the corrugated hoop is used, the under face of the base is provided with rectangular cavities of varying depth to engage over each substantially (in plan) projection or waving portion 20 or $21^a$. Other variations in the type of hoop used may be indulged in without departure from the spirit of my invention, the object being to avoid creeping to the tire sections with respect to the hoop.

The wooden felly of a wheel is shown at 24; to it is secured the ordinary grooved tire member 25, provided with inturned clencher flanges 26; to each side of the wooden felly are secured flange members 27 and $27^a$, which are held to the felly by bolts 28. The flanges 27 may be additionally secured to the clencher tire member 26 by small bolts 30, which engage through the clencher rim and through the web of the flange 27. I prefer, however, in place of the bolts 30, to use a hook 31 arranged to engage through a hole in the web of the flange $27^a$, with its hooked end engaging over the inturned clencher flange 26. The end of the hook 31 is brought around and engages with the bolt 28, thus securing the flange without the use of additional bolts; they are also employed to hold the flanges to the wooden rim, thus avoiding the use of a multiplicity of screw-threaded and nut-secured bolts; the flange 27 may be made in several pieces, as indicated in Fig. 11. It is provided with an inner flange 32, by which it is secured to the wooden felly, and with an inturned edge 33, the top of which is a relatively broad surface 34 which lies in close proximity to the projecting flanges 38 and 39 of the tire sections, and on the under run of the wheel these flanges come, or may come, under heavy load, into engagement with the rubber flanges 38 and 39. It is intended that under conditions of a heavy load, or even a moderate load, quite a proportion thereof shall be borne by these rubber flanges 38 and 39 as they are pressed against the top surfaces 34 of the flanges 27 and $27^a$, rather than that the bases 16 of the rubber sections should bear with all of the weight of the load against the flexible hoop 22, thereby bringing the hoop into heavy engagement with the felly. In this way the resiliency of the hoop can be maintained and reserved more particularly for normal conditions of load and speed.

It should be understood that while the form of spanner or reinforcing piece illustrated is the preferred one, I do not limit myself thereto, since one of considerably different cross-sectional outline might be used, provided it embodied a form which at the same time could be engaged at its ends by the flanges 27 and $27^a$ and could be firmly enough embedded in the rubber mass.

What I claim is:—

In a vehicle tire, the combination of a wheel felly, a resilient hoop member engaging thereabout, a plurality of cushion members of T shaped cross section arranged about said hoop member, with their end portions interlocking, a reinforcing metal piece in each of said cushion members, a series of independent flanged members engaging on each side of said felly and about the inner portions of said cushion members, against whose flanged edges the inner ends of said reinforcing metal pieces are adapted to engage, and bolt members for holding said flanged members in place, substantially as described.

In testimony whereof, I sign this specification in the presence of two witnesses.

SHERMAN T. ALLEN.

Witnesses:
CHARLES F. BURTON,
VIRGINIA C. SPRATT.

---

Copies of this patent may be obtained for five cents each, by addressing the "Commissioner of Patents, Washington, D. C."